June 27, 1967   J. H. BERTIN   3,327,797
GROUND EFFECT VEHICLE WITH DETACHABLE FLEXIBLE SKIRT
Filed May 4, 1966
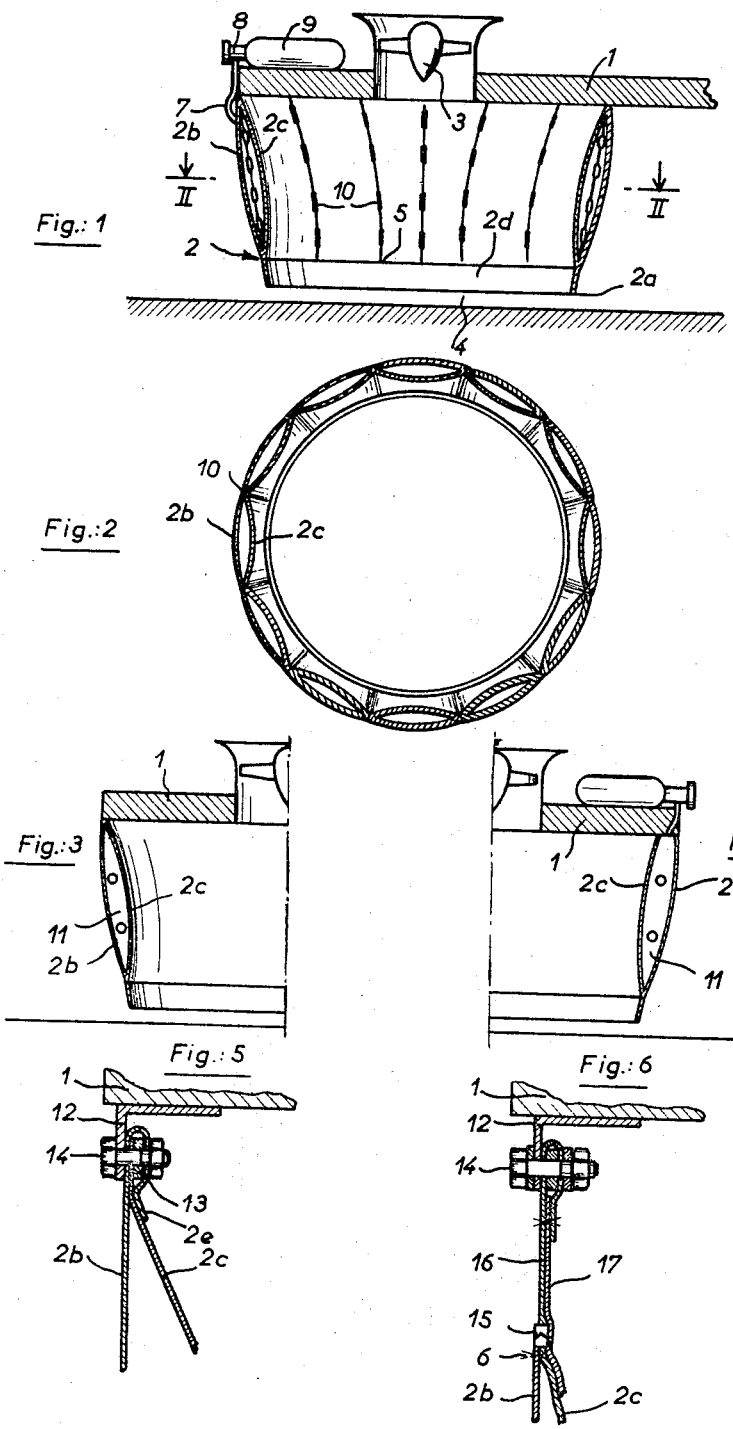

United States Patent Office 3,327,797
Patented June 27, 1967

3,327,797
GROUND EFFECT VEHICLE WITH DETACHABLE
FLEXIBLE SKIRT
Jean Henri Bertin, Neuilly-sur-Seine, France, assignor to
Bertin & Cie, Paris, France, a company of France
Filed May 4, 1966, Ser. No. 547,606
Claims priority, application France, May 7, 1965,
16,281
4 Claims. (Cl. 180—7)

This invention relates to vehicles supported by at least one pressure-fluid cushion, for example a compressed-air cushion, particularly those that are supported by several cushions each surrounded by a deformable skirt.

Skirts of this kind used for defining, under air-cushion vehicle platforms, borne on cushions of the plenum chamber type are generally substantially in the form of frustums of cones. This arrangement is favorable for passing over obstacles on the ground, but if the vehicle is moving over a stretch of rough water and the dynamic pressure of a wave is higher than the pressure prevailing in the skirt in question, considerable deformations of that skirt may occur and upset the proper operation.

One way of increasing the apparent rigidity of a skirt or, in the case of deformation, reducing the time it takes to return to its initial form is to give it a relatively high degree of conicity. But for a given size of the skirt an unfavourable reduction of its area and lifting capacity results, together with some difficulties in clearing solid obstacles encountered on the ground. Furthermore, the only way to vary the tension and consequently the rigidity of the skirt is to adjust the pressure of the fluid forming the cushion, which has an effect on the lifting capacity of the latter.

The invention relates to a deformable skirt whose rigidity can be adjusted as desired during the operation of the vehicle.

The invention also relates to a particularly simple form of flexible skirt the rigidity of which can be adjusted during operation.

A flexible skirt according to the invention is preferably made of two impermeable sheets of substantially the same dimensions connected at the bottoms along a line approximately parallel with the free edge of the skirt, rigidly connected to the structure of the vehicle at their tops and likewise rigidly connected in meridian planes, the gap between the two sheets being filled with a fluid at an adjustable pressure.

According to an advantageous embodiment, the inner and outer connection of the sheets in a meridian plane is effected by a seam and the latter is interrupted locally so as not to oppose the passage of pressure fluid which separates the sheets from one another locally, giving the skirt a ribbed appearance. The sheets are joined at the tops by securing the skirt to the structure of the vehicle, while the bottom seam is separated from the free edge of the skirt by a non-inflatable part.

As a modification, meridian partitions in any form can be provided between the two sheets, at least some of which partitions have passages for the inflation fluid.

Finally, the two sheets may be secured separately to the structure of the vehicle.

The following description with reference to the attached drawings, given as a non-limitative example, will clarify the various features of the invention.

FIGS. 1 and 2 show respectively in elevation and a cross-section taken along line II—II of FIGURE 1, part of a vehicle supported by at least one skirt according to the invention;

FIGS. 3 and 4 are two half-views corresponding to FIG. 1 and illustrate two possible modifications of such a skirt, and FIGS. 5 and 6 show on a larger scale two methods of securing the skirt to the platform.

The platform is designated 1. The skirt, generally designated 2, delimits an air cushion or a cushion of any other fluid, the pressure of which is maintained by pumping means 3 such as a blower and which escapes through the gap 4 between the ground and the free bottom edge 2a of the skirt. The latter is preferably circular in plan, but the invention includes different shapes, which naturally depend on the form in plan of the means which secure the top of the skirt to the platform.

The skirt 2 comprises two outer and inner sheets 2b, 2c respectively, made of any impermeable material and preferably inextensible. A fabric made of synthetic textile material impregnated with a rubber coating is perfectly suitable for this purpose. The sheets 2b, 2c are joined at the bottoms along a line 5 parallel with the free edge 2a of the skirt, for example by sewing and sticking. The part 2b of the skirt between the seam 5 and the edge 2a may be formed either by the extension of at least one of the sheets or by a separate member made of a very wear-resisant material. The sheets 2b, 2c are preferably joined at the top (FIGS. 1 to 3) for example by a seam 6 (FIG. 6).

The space between the two sheets is kept at a determined pressure of a fluid, which may be a gas or even a liquid. In the former case, it suffices, for example, to connect this space by a pipe 7 to the adjustable reducing valve 8 on a cylinder 9 of air or compressed gas. Adjustment of the reducing valve, which may of course include an adjusted valve for connection with the open-air, enables the pressure between the sheets to be adjusted as desired while the vehicle is operating. For example, the pilot may make the or each skirt more rigid when passing over a stretch of rough water. A rigid skirt is suitable for diminishing any vertical oscillations of the vehicle.

To prevent the inflation of the space between the sheets 2b, 2c from causing any shortening of the skirt 2, these sheets are connected, at least in places, by cross-pieces preventing them from moving apart. In FIGS. 1 and 2, these cross-pieces are simply made of discontinuous stitching 10 situated for example in meridian planes. These stitchings give the skirt a ribbed appearance once it is inflated, but do not oppose the passage of the inflation fluid from one rib to its neighbors.

As a modification, shown in FIG. 3, the stitchings 10 can be replaced by perforated partitions 11 or even, in a per se known manner, by a plurality of threads of appropriate length. In another modification shown in FIG. 4, the top edges of the sheets 2b and 2c are secured independently to the platform 1 in a sealing-tight manner.

FIGS. 5 and 6 show on a larger scale two methods of securing the assembly of the sheets 2b, 2c to this platform. Only one of these sheets may, of course, be secured in the same way.

In FIG. 5, the platform has a downwardly projecting edge 12, along an outline which determines the shape in plan of the top of the skirt. This edge is, for example, one wing of an angle member secured to the bottom of the platform by any conventional means, for example sticking. The sheets 2b and 2c are applied to one another and pressed against the edge 12 by means of a strip 13 and bolts 14 at regular intervals. Preferably, the sheet 2b has an extension 2e turned down below the strip 13 and stuck to the sheet 2c.

To facilitate the removal and replacement of a skirt, as a modification, shown in FIG. 6, the sheets 2b, 2c may be sewn at 6, by connecting them rigidly to the bottom half of a slide fastener 15. The top half of this fastener is rigidly connected to a flexible and impermeable strip 16, which is secured to the edge 12. An impermeable flap 17 is disposed inside the strip 16 and secured at the same time as the latter to the edge 12 when the fastener 15 is not sealing-tight to the pressure fluid of the cushion. The pressure inside this cushion forces the flap against the strip 16 in this case.

What is claimed is:

1. A flexible skirting device designed to be easily and quickly fitted to ground effect vehicle or the like having a load supporting platform means, said skirting device depending from said platform means and bounding laterally a pressure fluid cushion formed against a bearing surface, said skirting device having two longitudinally spaced ends: a remote end relative to said platform defining the periphery of an open orifice designed, in operation, to extend in a transverse plane adjacent and generally parallel to said surface and an adjacent end relative to said platform extending in another generally transverse plane remote from said surface and adjacent said platform means, wherein the improvement comprises slide fastener means having one portion secured to and extending along said adjacent end and another portion secured to said platform means for quick attachment and removal of said skirting device from said platform means.

2. A skirting device as claimed in claim 1, further comprising a fluidtight flap extending along the inside of said slide fastener means and adapted for engaging the same upon application of internal pressure, thereby to ensure fluidtightness along said slide fastener means.

3. A skirting device as claimed in claim 1, wherein at least a portion thereof between said ends comprises an inflatable double-walled fluidtight envelope made of two thin adjacent sheets fluidtightly joined to each other along two lines extending in generally transverse, longitudinally spaced planes, one adjacent said remote end and the other adjacent said slide fastener means.

4. A skirting device as claimed in claim 3, wherein said inflatable envelope is of generally frustoconical shape tapering toward said remote end which forms a minor base for such shape whereas said slide fastener means form a major base for such shape.

References Cited

UNITED STATES PATENTS

| | | | |
|---|---|---|---|
| 3,182,740 | 5/1965 | Cockerell | 180—7 |
| 3,203,498 | 8/1965 | Cockerell | 180—7 |
| 3,229,781 | 1/1966 | Jones | 180—7 |
| 3,248,086 | 4/1966 | Cockerell | 180—7 X |

A. HARRY LEVY, *Primary Examiner.*